United States Patent
Joshi et al.

(10) Patent No.: US 7,254,950 B2
(45) Date of Patent: Aug. 14, 2007

(54) METHODS AND APPARATUS FOR OPERATING GAS TURBINE ENGINES

(75) Inventors: Narendra Joshi, Cincinnati, OH (US); Michael Reale, Milford, OH (US); James K. Prochaska, Spring, TX (US); Joseph D. Peters, Houston, TX (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 11/056,973

(22) Filed: Feb. 11, 2005

(65) Prior Publication Data

US 2007/0144176 A1    Jun. 28, 2007

(51) Int. Cl.
F02C 7/143 (2006.01)

(52) U.S. Cl. .......................................... 60/728; 415/179

(58) Field of Classification Search ................. 60/728, 60/736, 783, 784; 415/179
See application file for complete search history.

(56) References Cited

U.S. PATENT DOCUMENTS

| | | | | |
|---|---|---|---|---|
| 4,896,499 A | * | 1/1990 | Rice | 60/728 |
| 4,949,544 A | * | 8/1990 | Hines | 60/728 |
| 5,655,373 A | | 8/1997 | Yamashita et al. | |
| 5,782,093 A | | 7/1998 | Yamashita et al. | |
| 5,937,633 A | | 8/1999 | Wang | |
| 6,408,609 B1 | | 6/2002 | Andrepont | |

FOREIGN PATENT DOCUMENTS

JP     3-258926     * 11/1991

OTHER PUBLICATIONS

Narendra Digamber Joshi et al.; Methods and Apparatus for Operating Gas Turbine Engines; U.S. Appl. No. 10/699,244; filed Oct. 31, 2003; 15 pgs.
Narendra Digamber Joshi et al.; Methods and Apparatus for Operating Gas Turbine Engines; U.S. Appl. No. 10/856,640; filed May 28, 2004; 13 pgs.
Michael Joseph Reale et al.; Methods and Apparatus for Operating Gas Turbine Engines; filed Jan. 26, 2005; 16 pgs.

* cited by examiner

Primary Examiner—L. J. Casaregola
(74) Attorney, Agent, or Firm—William Scott Andes; Armstrong Teasdale LLP

(57) ABSTRACT

A method for operating a gas turbine engine, including a first compressor, a second compressor, a combustor and a turbine, coupled together in serial flow arrangement, and an intercooler coupled between the first compressor and the second compressor, the intercooler including a first heat exchanger and a second heat exchanger. The method includes channeling compressed airflow from the first compressor to the first heat exchanger, extracting energy from the compressed airflow using a first working fluid flowing through the first heat exchanger to facilitate reducing an operating temperature of the compressed airflow and to facilitate increasing an operating temperature of the first working fluid, and channeling the first working fluid to a process heat exchanger, and channel the compressed airflow form the first heat exchanger to the second compressor.

7 Claims, 3 Drawing Sheets

METHODS AND APPARATUS FOR OPERATING GAS TURBINE ENGINES

BACKGROUND OF THE INVENTION

This invention relates generally to gas turbine engines, and more specifically to methods and apparatus for operating gas turbine engines.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

Gas turbine engines are used in many applications, including in aircraft, power generation, and marine applications. The desired engine operating characteristics vary, of course, from application to application. Accordingly, at least one known gas turbine includes a booster compressor to facilitate increasing the pressure of the air entering the high pressure compressor, which results in increased power output and efficiency of the gas turbine engine. An intercooler heat exchanger may be positioned between the booster compressor and the high-pressure compressor to facilitate reducing the temperature of the air entering the high-pressure compressor. Using an intercooler facilitates increasing the efficiency of the engine while reducing the quantity of work performed by the high pressure compressor. Moreover, at least one known intercooler heat exchanger uses water as a cooling medium to cool the air flow exiting the booster compressor. When water is used as the cooling medium, heat from the water is rejected using water cooled cooling towers. The intercooler system rejects substantially all of the heat generated from the intercooler into the atmosphere. Accordingly, the heat rejected by the intercooler is not captured and thus not utilized for any beneficial purpose.

BRIEF DESCRIPTION OF THE INVENTION

In one aspect, a method for operating a gas turbine engine, including a first compressor, a second compressor, a combustor and a turbine, coupled together in serial flow arrangement, and an intercooler coupled between the first compressor and the second compressor, the intercooler including a first heat exchanger and a second heat exchanger. The method includes channeling compressed airflow from the first compressor to the first heat exchanger, extracting energy from the compressed airflow using a first working fluid flowing through the first heat exchanger to facilitate reducing an operating temperature of the compressed airflow and to facilitate increasing an operating temperature of the first working fluid, and channeling the first working fluid to a process heat exchanger, and channel the compressed airflow form the first heat exchanger to the second compressor.

In another aspect, an intercooler system for a gas turbine engine that includes at least a first compressor, a second compressor, a combustor, and a turbine is provided. The intercooler system includes an intercooler comprising a first cooling system having a first working fluid flowing therethrough and configured to extract energy from the compressed airflow flowing therethrough to facilitate reducing an operating temperature of the compressed airflow and to facilitate increasing an operating temperature of the first working fluid, and a process heat exchanger configured to receive the first working fluid.

In a further aspect, a gas turbine engine assembly is provide. The gas turbine engine assembly includes a first compressor, a second compressor downstream from the first compressor, a combustor and a turbine coupled in flow communication with the second compressor, and an intercooler system. The intercooler system includes an intercooler coupled downstream from the first compressor such that compressed air discharged from the first compressor is routed therethrough, the intercooler comprising a first heat exchanger having a first working fluid flowing therethrough and a second heat exchanger having a second working fluid flowing therethrough, the second heat exchanger configured to receive the compressed airflow discharged from the first heat exchanger system and extract energy from the compressed airflow to facilitate reducing an operating temperature of the airflow discharged from the second heat exchanger.

DETAILED DESCRIPTION OF THE INVENTION

Figure 1:
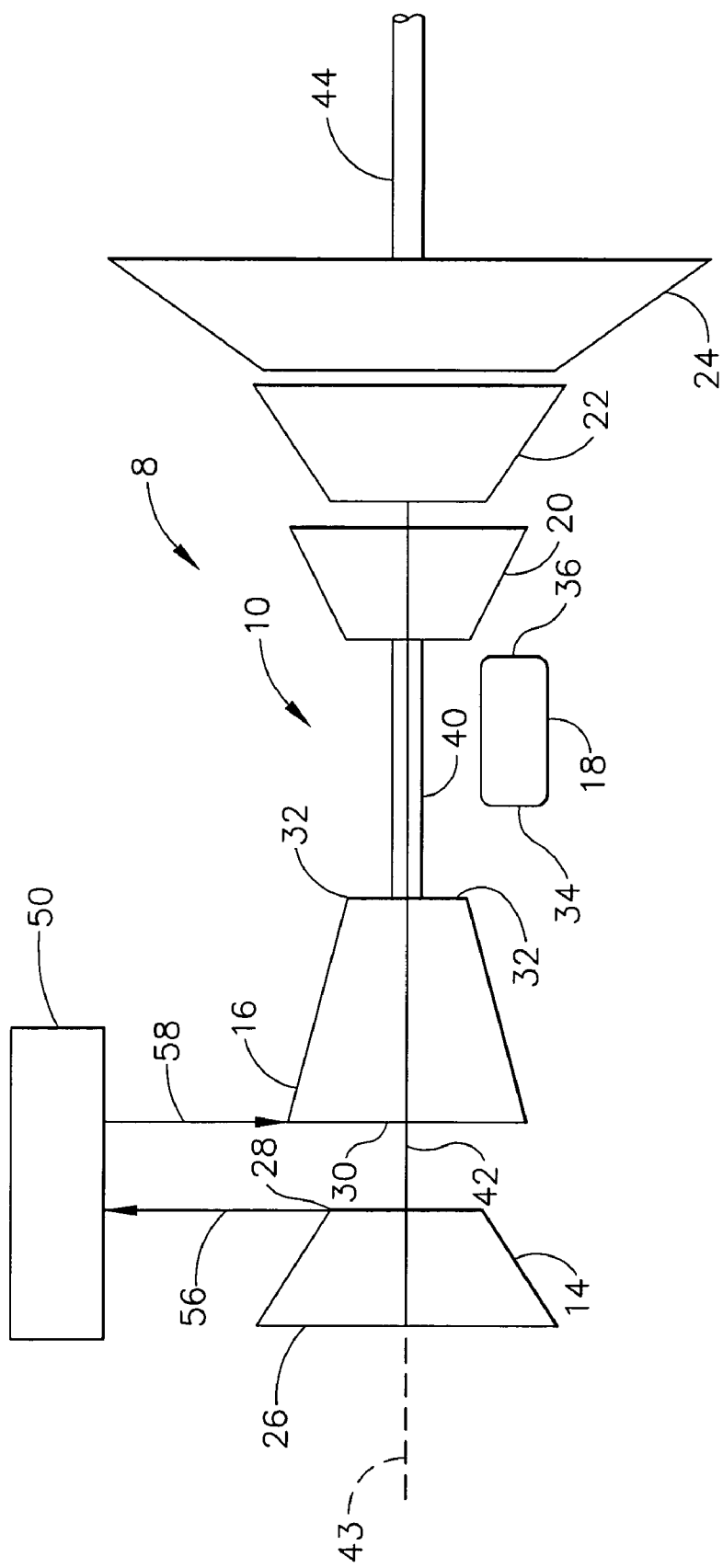
FIG. 1 is a block diagram of an exemplary gas turbine engine including an intercooler system.

FIG. 1 is a block diagram of a gas turbine engine assembly 8 including a gas turbine engine 10 and an intercooler system 50. With the exception of intercooler system 50, described in more detail below, engine 10 is known in the art and includes, in serial flow relationship, a low pressure compressor or booster 14, a high pressure compressor 16, a combustor 18, a high pressure turbine 20, a low pressure, or intermediate turbine 22, and a power turbine or free turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36.

High pressure turbine 20 is coupled to high pressure compressor 16 with a first rotor shaft 40, and low pressure turbine 22 is coupled to low pressure compressor 14 with a second rotor shaft 42. Rotor shafts 40 and 42 are each substantially coaxially aligned with respect to a longitudinal centerline axis 43 of engine 10. Engine 10 may be used to drive a load (not shown) which may be coupled to a power turbine shaft 44. Alternatively, the load may be coupled to a forward extension (not shown) of rotor shaft 42.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24.

The power output of engine 10 is at least partially related to the temperatures of the gas flow at various locations along the gas flow path. More specifically, a temperature of the gas flow at high-pressure compressor outlet 32, and a temperature of the gas flow at combustor outlet 36 are closely monitored during the operation of engine 10. Lowering the temperature of the gas flow entering high pressure compressor 16 generally results in increasing the power output of engine 10.

To facilitate lowering the temperature of the gas flow entering high pressure compressor 16, gas turbine engine 10 includes intercooler system 50 that is coupled in flow communication to low pressure compressor 14. Airflow from low pressure compressor 14 is channeled to intercooler system 50 for additional cooling prior to being returned to high-pressure compressor 16.

Figure 2:
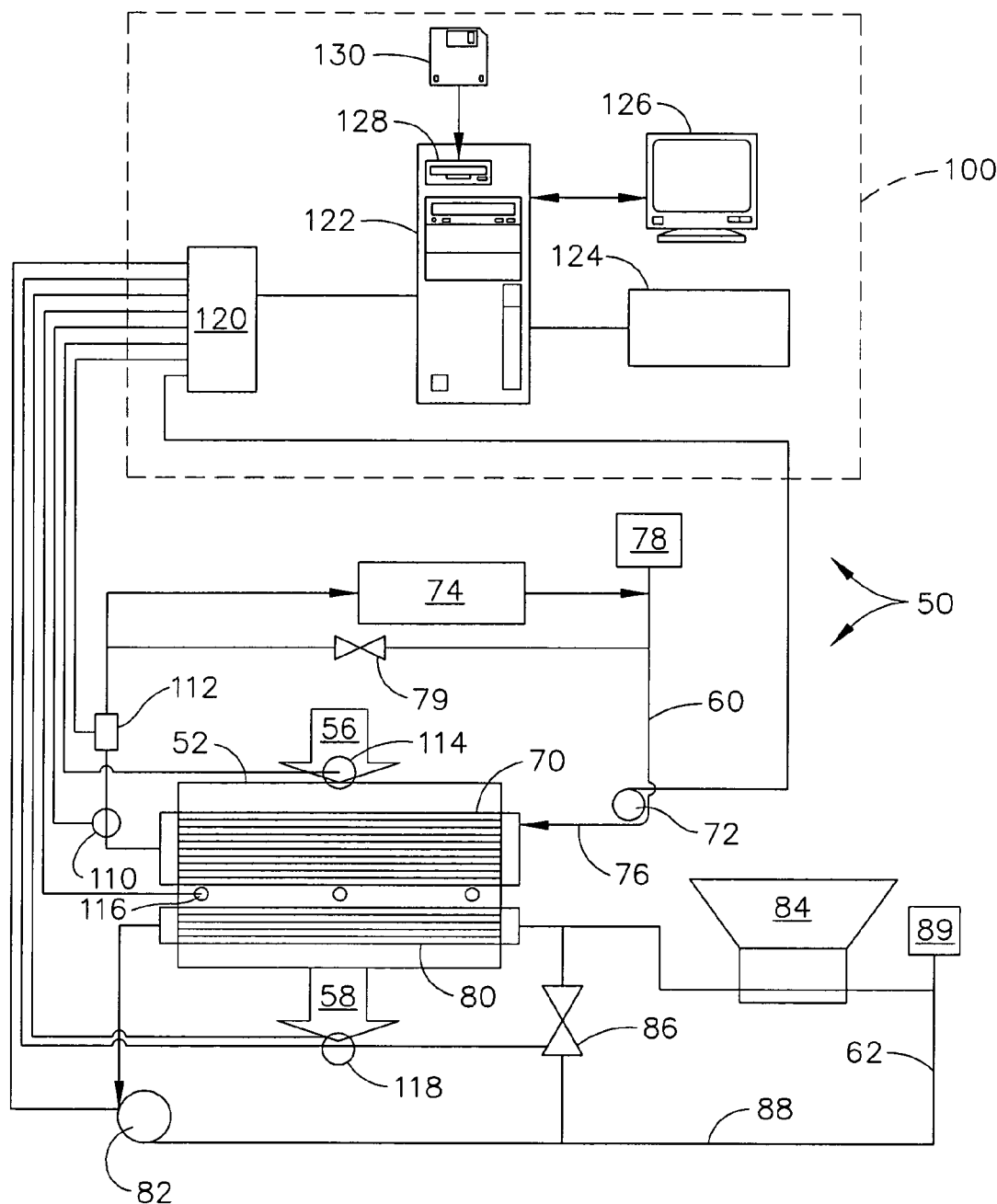
FIG. 2 is a block diagram of the exemplary intercooler system shown in FIG. 1 during normal gas turbine operation.

FIG. 2 is a block diagram of exemplary intercooler system 50 shown in FIG. 1. To facilitate reducing the operating temperature of a gas flow entering high pressure compressor 16, intercooler system 50 includes an intercooler 52. In the exemplary embodiment, airflow 56 from low pressure compressor 14 is channeled through intercooler 52 for additional cooling prior to the cooled air 58 being returned to high-pressure compressor 16.

In the exemplary embodiment, intercooler system 50 also includes a first or primary cooling system 60 and a second or secondary cooling system 62. Primary cooling system 60 includes a heat exchanger 70, a pump 72, and at least one process heat exchanger 74 that is coupled in flow communication with heat exchanger 70 and pump 72. Process heat exchanger, as used herein, is defined as a heat exchanger located in a facility that is configured to generate heat to facilitate heating the facility. Moreover, although only one process heat exchanger 74 is described herein, it should be realized that primary cooling system 60 may include a plurality of process heat exchangers 74 that are installed in one or a plurality of different facilities to heat the various facilities. In the exemplary embodiment, primary cooling system 60 is operated in a substantially closed-loop configuration and includes a working fluid 76 flowing therethrough for removing energy extracted from the gas flow path. Accordingly, and in the exemplary embodiment, primary cooling system 60 includes a tank or reservoir 78 to facilitate adding additional working fluid 76 to primary cooling system 60 as desired. In an alternative embodiment, primary cooling system 60 includes a bypass valve 79 such that at least a portion of working fluid 76 that is discharged from heat exchanger 70 may be bypassed around process heat exchanger 74 back to pump 72.

Secondary cooling system 62 includes a heat exchanger 80, a pump 82, a cooling tower 84, and a bypass valve 86. In the exemplary embodiment, secondary cooling system 62 is operated in a substantially closed-loop configuration and includes a working fluid 88 flowing therethrough for removing energy extracted from the gas flow path. Accordingly, and in the exemplary embodiment, secondary cooling system 62 includes a tank or reservoir 89 to facilitate adding additional working fluid 88 to secondary cooling system 62 as desired. In the exemplary embodiment, bypass valve 86 is operable such that at least a portion of working fluid 88 that is discharged from heat exchanger 80 may be bypassed around cooling tower 84 back to pump 82.

Intercooler system 50 also includes a control system 100 that is configured to control the operation of intercooler system 50. More specifically, and in the exemplary embodiment, control system 100 includes a temperature sensor 110 and a mass flow sensor 112 that are each coupled to primary cooling system 60. More specifically, temperature sensor 110 and mass flow sensor 112 are configured to sense the temperature and the mass flow rate of working fluid 76 within primary cooling system 60. Control system 100 also includes a temperature sensor 114, a temperature sensor 116, and a temperature sensor 118. In the exemplary embodiment, temperature sensor 114 is configured to sense the temperature (T23) of airflow 56, that is channeled into intercooler 52, temperature sensor 116 is configured to sense the air temperature (T24) between heat exchangers 70 and 80, respectively, and temperature sensor 118 is configured to sense the temperature (T25) of airflow 58, that is discharged from intercooler 52. In the exemplary embodiment, control system 100 is also electrically coupled to pump 72, pump 82, and bypass valve 86 to facilitate controlling the operation of pump 72, pump 82, and bypass valve 86, respectively. More specifically, control system 100 is configured to energize/de-energize pumps 72 and 82, and to open/close bypass valve 86 based on inputs received from intercooler system 50, or alternatively, inputs received from an operator. In an alternative embodiment, control system 100 also includes a temperature sensor (not shown) and a mass flow sensor (not shown) that are configured to sense the temperature and the mass flow rate of working fluid 88 within secondary cooling system 62.

In the exemplary embodiment, a control interface section 120 samples analog data received from temperature sensor 110, mass flow sensor 112, temperature sensor 114, temperature sensor 116, temperature sensor 118, pump 72, pump 82, and bypass valve 86. Control interface section 120 converts the analog data to digital signals for subsequent processing. A computer 122 receives the sampled and digitized sensor data from control interface section 120 and performs high-speed data analysis.

Computer 122 receives commands from an operator via a keyboard 124. An associated monitor 126 such as, but not limited to, a liquid crystal display (LCD) and/or a cathode ray tube, allows the operator to observe data received from computer 122. The operator supplied commands and parameters are used by computer 122 to provide control signals and information to control interface section 120.

In one embodiment, computer 122 includes a device 128, for example, a floppy disk drive, CD-ROM drive, DVD drive, magnetic optical disk (MOD) device, and/or any other digital device including a network connecting device such as an Ethernet device for reading instructions and/or data from a computer-readable medium 130, such as a floppy disk, a CD-ROM, a DVD or an other digital source such as a network or the Internet, as well as yet to be developed digital means. In another embodiment, computer 122 executes instructions stored in firmware (not shown). Computer 122 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

Figure 3:
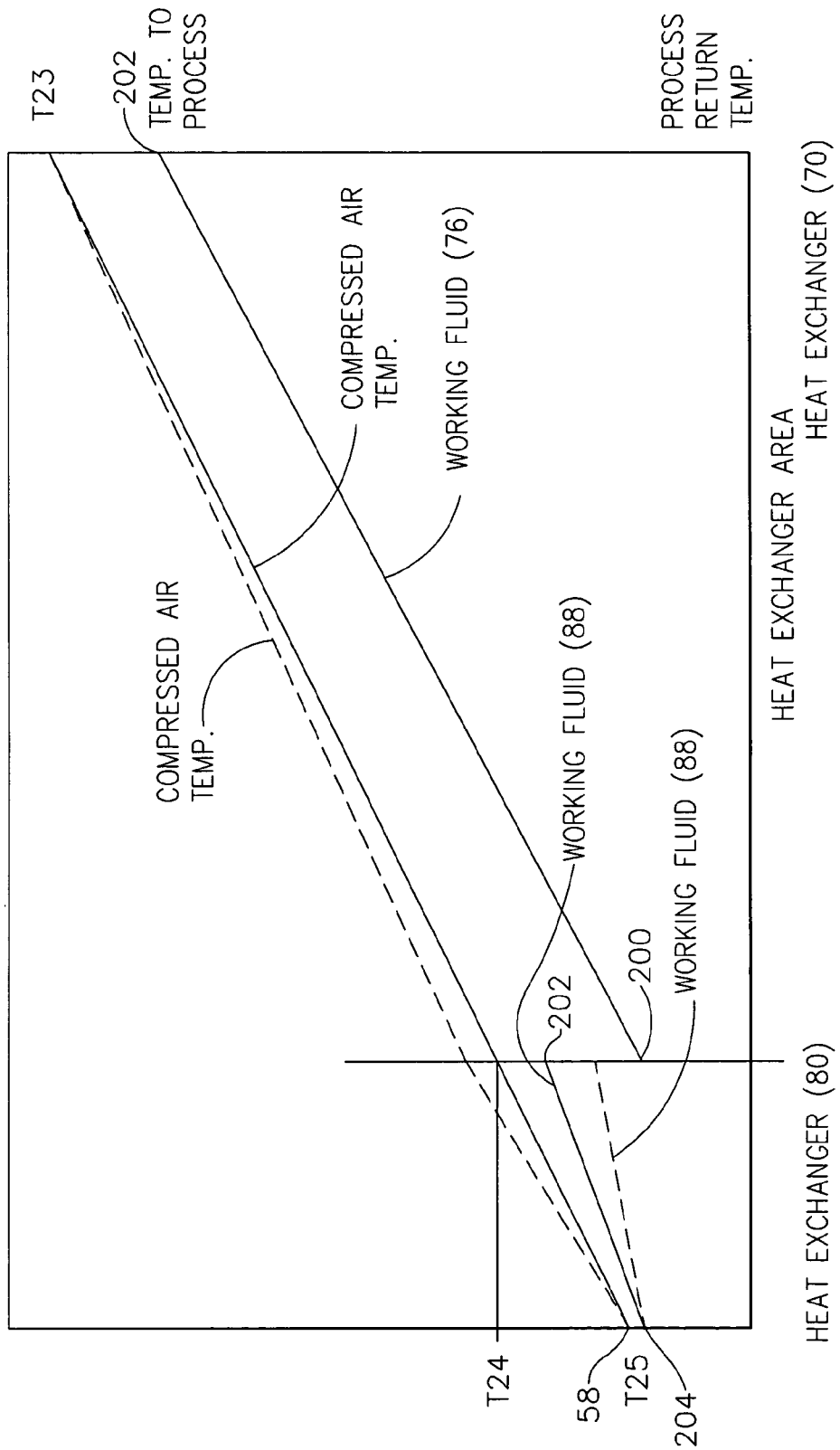
FIG. 3 is a graphical illustration of the intercooler system shown in FIG. 2 during normal gas turbine operation.

FIG. 3 is a graphical illustration of intercooler system 50 during normal operation. In the exemplary embodiment, pump 72 is activated such that working fluid 76, at a first temperature, is channeled through heat exchanger 70, and pump 82 is activated such that working fluid 88, at a first temperature, is channeled through heat exchanger 80. Gas turbine engine 10 is then initialized such that airflow 56 is channeled through intercooler 52. More specifically, airflow 56, at a first temperature T23, is channeled through heat exchanger 70. For example, and in the exemplary embodiment, i.e. T23≈350 degrees Fahrenheit. Primary cooling system 60, including heat exchanger 70, extracts the heat from airflow 56 thus decreasing a temperature of airflow 56. In the exemplary embodiment, the temperature of airflow 56 discharged from heat exchanger 70 is approximately 150 degrees Fahrenheit. Moreover, the heat extracted from airflow 56 is utilized to increase the temperature of working fluid 76. Therefore, as shown in FIG. 3 as airflow 56 is channeled into heat exchanger 70, at a temperature T23 (shown at left of FIG. 3), working fluid 76 is channeled through heat exchanger 70 in a direction opposite of airflow 56 (shown in FIG. 3 from left to right) such that the temperature of airflow 56 gradually decreases from a first temperature T23, to a second temperature T24, whereas, a temperature of working fluid 76 gradually increases from a first temperature 200 to a second temperature 202, that is greater than the first temperature 200. In the exemplary embodiment, process heat exchanger 74 extracts as much heat as desired prior to the relatively cooler airflow 56 being channeled to heat exchanger 80.

The relatively cooler airflow 56 is then channeled through heat exchanger 80 such that the temperature of airflow 56 gradually decreases from a first temperature T24, to a second temperature T25, whereas, a temperature of working fluid 88 gradually increases from a first temperature 204 to a second temperature 206, that is greater than the first temperature 204. In the exemplary embodiment, airflow 58, that is channeled to compressor 16, is maintained at a desired temperature by utilizing at least one of a variable speed pump 82 and/or a bypass valve 86. More specifically, variable speed pump 82 varies the quantity of working fluid 88 that is channeled through heat exchanger 80 therefore regulating the temperature of airflow 58 that is channeled to compressor 16. Alternatively, control system 100 either opens and/or closes bypass valve 86 to facilitate regulating the quantity of working fluid 88 that is channeled through heat exchanger 80 therefore regulating the temperature of airflow 58 that is channeled to compressor 16.

In an alternative embodiment, shown in FIG. 3 with dashed lines, if process heat exchanger 74 is maintained at a lower temperature setpoint, compressed airflow 56 channeled through heat exchanger 70 will enter heat exchanger 80 at a relatively greater temperature (T24). Accordingly, control system 100 either opens and/or closes bypass valve 86 to facilitate increasing the quantity of working fluid 88 that is channeled through heat exchanger 80 therefore regulating the temperature of airflow 58 that is channeled to compressor 16 (T25) at the desired temperature.

Primary cooling system 60 therefore facilitates reducing an operating temperature of airflow 56 prior to airflow 56 being channeled through heat exchanger 80. Moreover, a temperature of working fluid 76 is increased prior to working fluid 76 being channeled through process heat exchanger 74. Accordingly, the heat rejected from airflow 56 is utilized to increase an operating temperature of working fluid 76 within cooling system 60, which is then channeled to process heat exchanger 74 and utilized for process applications such as, but not limited to, heating various buildings.

After airflow 56 is channeled through heat exchanger 70, the substantially cooler air is then channeled through heat exchanger 80. More specifically, and in the exemplary embodiment, the airflow entering heat exchanger 80 (T24) has an operating temperature of approximately 150 degrees Fahrenheit, i.e. T24≈150 degrees Fahrenheit. Secondary cooling system 62, including heat exchanger 80, extracts the heat from the airflow thus further decreasing the temperature of airflow 58 (T25), i.e. T25≈100 degrees Fahrenheit. In the exemplary embodiment, a temperature of the airflow entering heat exchanger 80 (T24) is reduced utilizing secondary cooling system 62 until airflow 58 (T25) is maintained at a predetermined operating temperature, e.g. T25≈100 degrees Fahrenheit. Moreover, the heat extracted from the airflow is utilized to increase the temperature of working fluid 88. Secondary cooling system 62 therefore facilitates reducing an operating temperature of the airflow prior to the airflow being channeled to high pressure compressor 16.

Accordingly, and in the exemplary embodiment, the mass flow rate of the gas turbine air flow and the energy extraction can be independently controlled by utilizing secondary cooling loop 62 to cool the air flow to the desired T25 temperature independently of the heat extracted in first cooling loop 60. More specifically, control system 100 measures the compressed air temperature T23, the intercooler temperature T24 and obtains the mass flow of the air from the gas turbine controls (not shown). A predetermined or desired T25 is entered into control system 100. Control system 100 then computes the mass flow rate and the temperature of working fluid 88 within secondary cooling loop 62 that will extract the heat remaining in the compressed air after primary cooling loop 60 has extracted the desired energy for use in process heat exchanger 74. After control system 100 has computed the mass flow rate and the temperature of working fluid 88, bypass valve 86 is energized to facilitate regulating the quantity of working fluid 88 that is channeled through heat exchanger 80. Thus, control system 100 facilitates regulating the temperature of airflow 58 (T25) that is channeled to high pressure compressor 16 by operating bypass valve 86 to either increase or decrease the quantity of working fluid 88 that is channeled through heat exchanger 80.

The above-described intercooler system includes an intercooler heat exchanger that is used to facilitate producing hot water and/or low temperature steam for process applications such as heating buildings in a district heat application. The district may include one or more spaces, wherein auxiliary heat exchangers are used to extract heat from this heated media for process or conditioning. More specifically, the intercooler system described herein includes two distinct coolant circuits, a primary cooling system and a secondary cooling system. The primary cooling system is used to extract heat from the compressed air received from the gas turbine engine. Whereas the secondary cooling system is used to reduce the operating temperature of the airflow channeled back to the gas turbine engine. In the exemplary embodiment, the mass flow rate of the gas turbine air flow and the energy extraction are independently controlled by utilizing the secondary cooling system to cool the air flow channeled to the gas turbine engine to a desired T25 temperature. More specifically, a control system measures the compressed air temperature T23, the intercooler temperature T24, and obtains the mass flow of the air from the gas turbine controls. The control system also obtains the desired T25 from the gas turbine controls. The control system then computes the mass flow rate and the temperature of the working fluid within the secondary cooling system that will extract the heat remaining in the compressed air after the primary cooling system has extracted all energy it desired.

The intercooler system described herein therefore can be used to heat a district, thereby reducing need for additional heating sources, such as, but not limited to, natural gas. Accordingly, a gas turbine combined cycle power plant can be utilized to develop electrical power and to heat at least one building. Moreover, the intercooler system described herein facilitates utilizing between approximately 60% and 80% of the energy otherwise rejected by at least one known intercooler. The intercooler system described herein also permits the heat extraction system and the gas turbine to work independently within limited parameter range. The intercooler system described herein therefore provides a cost-effective and highly reliable method for heating a district utilizing a gas turbine engine.

Exemplary embodiments of an intercooler system are described above in detail. The intercooler system is not limited to the specific embodiments described herein, but rather, components of the system may be utilized independently and separately from other components described herein. Specifically, the intercooler system described herein may be utilized on any known gas turbine engine.

While the invention has been described in terms of various specific embodiments, those skilled in the art will recognize that the invention can be practiced with modification within the spirit and scope of the claims.

What is claimed is:

1. An intercooler system for a gas turbine engine that includes at least a first compressor, a second compressor, a combustor, and a turbine, said intercooler system comprising:
    an intercooler comprising a first cooling system having a first working fluid flowing therethrough and configured to extract energy from the compressed airflow flowing from the first compressor to facilitate reducing an operating temperature of the compressed airflow and to facilitate increasing an operating temperature of said first working fluid, and to channel the compressed air to the second compressor;
    a process heat exchanger configured to receive said first working fluid; and
    a control system configured to:
        receive an input from at least one of said intercooler system and an operator; and
        activate at least one of a working fluid valve and a working fluid pump based on said input.

2. An intercooler system in accordance with claim 1 wherein said process heat exchanger is configured to increase a temperature of a process.

3. An intercooler system in accordance with claim 1 wherein said intercooler further comprises a second cooling system that is different than said first cooling system, said second cooling system is configured to receive the compressed airflow discharged from said first cooling system and extract energy from the compressed airflow using a second working fluid flowing therethrough to facilitate reducing an operating temperature of the airflow discharged from said second cooling system to the second compressor.

4. An intercooler system in accordance with claim 3 wherein said control system is further configured to regulate the flow of said second working fluid through said second cooling system to facilitate regulating an operating temperature of the airflow channeled to the second compressor.

5. An intercooler system in accordance with claim 4 further comprising:
    a temperature sensor coupled to said control system and configured to determine an operating temperature of said second working fluid; and
    a mass flow sensor coupled to said control system and configured to determine a mass flow rate of said second working fluid.

6. An intercooler system in accordance with claim 5 wherein said control system is configured to utilize the determined second working fluid temperature and mass flow rate to operate at least one of a bypass valve and a variable speed pump to facilitate regulating the flow of said second working fluid through said second heat exchanger.

7. An intercooler system in accordance with claim 3 wherein said first cooling system comprises a first pump coupled in flow communication with a first heat exchanger and said second cooling system comprises a second pump coupled in flow communication with a second heat exchanger.

* * * * *